Patented Nov. 5, 1935

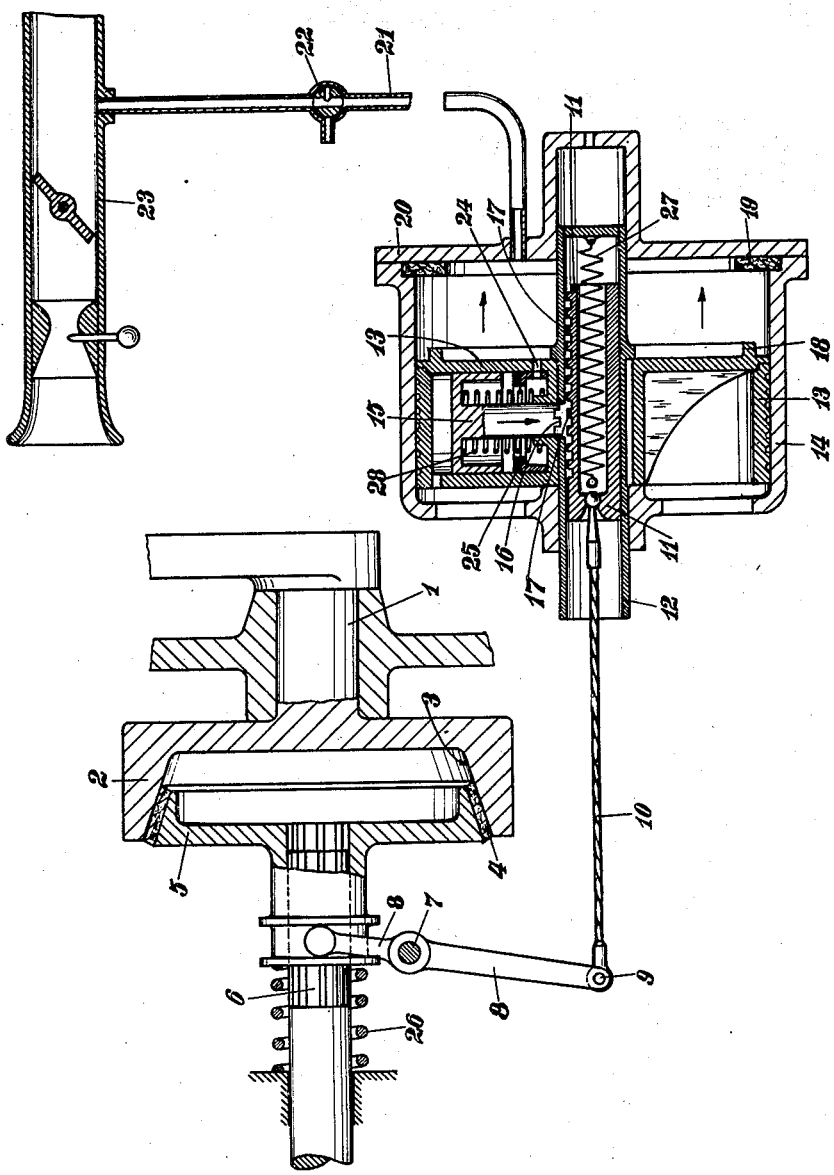

2,019,617

UNITED STATES PATENT OFFICE 2,019,617

MECHANISM FOR ACTUATING A FRICTION CLUTCH

Karl Maybach, Friedrichshafen, Germany, assignor to Maybach-Motorenbau G. m. b. H., Friedrichshafen, Germany Application June 20, 1933, Serial No. 676,634
In Germany July 9, 1932

1 Claim. (Cl. 121—38)

My invention relates to a mechanism for actuating a friction clutch, especially in motor vehicles. It has special reference to mechanisms of this kind which are operated by pressure fluid or means of vacuum creating in the suction tube of the motor cylinders.

In motor cars it is usual to insert a friction clutch between the motor and the change speed gearing. Generally this clutch is operated by means of a hand or foot lever. It has also been suggested to operate such clutches by pressure means, such as compressed air or vacuum, especially in such cases in which a supplemental device for engaging and dis-engaging the clutch was provided for the purpose of free-wheeling.

In such cases it is usual to make use of a piston operated by pressure means. To disengage the friction clutch it is necessary for one part thereof to be moved over a certain distance. The corresponding travel of the piston may for example be 70 millimetres. If the lining of the friction clutch is worn the distance for the movable portion of the clutch increases accordingly, so that the travel of the operating piston may increase to 200 millimetres for example. Consequently a very big and heavy pressure cylinder is necessary for the piston, especially in great motor cars having a strong motor. The piston will never fit tightly into the cylinder, as the tightening means are always imperfect. That is why there will always be a certain loss in pressure means, which means a great disadvantage, especially when vacuum is made use of resulting from the suction tube of the motor cylinders; because when running idle with the throttle being nearly closed the motor is most likely to get a wrong mixture of air and fuel.

All these disadvantages are avoided by my invention. I provide one piston for operating the clutch and a second piston for causing the connection between the first piston and the member connecting to the clutch, both pistons being moved by pressure means. The mechanism constructed according to my invention is very compact and need not be larger than is necessary for moving the movable part of the clutch over the usual distance for declutching, without taking into consideration the wear of the lining of the clutch.

A further object of my invention is a perfect tightness between piston and cylinder in the end position of the pistons, that is when the first piston has caused disengagement of the clutch and when the second piston has caused connection between the first piston and the member connecting to the clutch.

There are other objects connected with my invention which will be pointed out in the following part of the specification in which I refer to the drawing which represents an example embodying my invention.

The figure is a mere diagram showing the main elements in a vertical longitudinal section.

The end of the motor crank shaft 1 is in rigid connection with the fly-wheel 2 being provided with an inner conical circular plane 3. Clutch member 5, splined to shaft 6, at its outer circumference is shaped so as to fit into the conical part of fly wheel 2 and has a lining 4 which bears against plane 3 if the clutch members are engaged. Lever 8 is journaled at 7 and is adapted to move clutch member 5 out of engagement with member 2 against the pressure of spring 26 which tends to hold the clutch element constantly in engagement. Tension member 10 is fastened to lever 8 at 9 and its other end is connected to member 11. This member 11 has teeth 17 and is adapted to slide within sleeve 12 forming the piston rod for the main piston 13 which is surrounded by cylinder 14. Piston 13 is provided with a circular projection 18 adapted to bear against the annular lining 19 at the cylinder head 20. This lining 19 is more or less elastic so as to cause perfect air-tightness between the piston 13 and the cylinder 14 whenever the piston is in its right-hand position, which is always the case when the clutch members 2 and 5 are out of engagement. Consequently the air-tightness in this position is as perfect as possible and does not rely on the tightening of the piston at its circumference against the surrounding cylinder walls, as is usual.

There is an opening in the cylinder head 20 into which tube 21 fits. A cock or valve 22 allows to connect tube 21 either with the open air or with the tube leading from the carburetor to the cylinders of the motor; this latter tube is indicated at 23.

Piston 13 is again provided with a smaller piston 15 acting in a direction substantially at right angles to that of piston 13 and against the action of spring 28. The rod of piston 15 at its end has teeth 16 adapted to engage with the teeth 17 of member 11. Lining 25 disposed in the cylinder containing piston 15 is elastic and causes perfect air-tightness of piston 15 in its lower-most position, similar to lining 19 with regard to piston 13.

The operation of the mechanism is as follows:

If cock 22 is turned into the position represented in the drawing the vacuum created within tube 23 acts through tube 21 and opening 24 (in piston 13) on piston 15 and causes this piston to move in the direction indicated by the arrow on the piston rod so that it presses on lining 25 and at the same time teeth 16 engage with teeth 17 of member 11. The friction at the circumference of piston 15 and the resistance offered by spring 28 are only very slight, at least much lower than the friction between piston 13 and its cylinder 14, so that piston 15 is sure to be moved first. Thereafter the vacuum moves piston 13 to the right (direction of arrows) until piston 13 bears against lining 19. Consequently clutch members 2 and 5 are brought out of engagement, because member 11 moving together with piston 13 causes dis-engagement by means of member 10 and lever 8.

When cock 22 is turned to its other position so that tube 21 is connected with the open air the vacuum in cylinder 14 vanishes and piston 13 together with member 11 are moved back to the left under the action of spring 26 and at the same time piston 15 is pushed upward again by means of spring 28 so that teeth 16 and 17 disengage.

Whenever the lining 4 of the clutch is more worn member 11 is moved further to the left. To prevent member 11 from being moved to the left by shocks or other circumstances there is spring 27 which tends to draw member 11 into sleeve 12; but spring 27 has of course to be weaker than spring 26. Thus the position of member 11 within sleeve 12 depends on the wear of lining 4.

By my new arrangement the way for piston 13 does not vary substantially. Consequently the cylinder need not be longer than is necessary for ordinary purposes, independently of the wear of the lining of the clutch. This means that the mechanism will be comparatively light.

Of course, it is possible to use compressed air or other pressure means instead of vacuum for operating the mechanism; it has only to be adapted for this other means, as every expert knows.

I do not want to be limited to the details described or represented in the drawing as many variations will occur to those skilled in the art.

What I claim is:

Mechanism of the kind comprising: a cylinder; a piston in said cylinder adapted to be moved by pressure means; a loose piston rod to said piston; variable means for positioning said piston rod in relation to said piston; teeth on said loose piston rod; a second cylinder connected to said piston; a piston in said second cylinder adapted to be moved by the same pressure means as provided for the movement of said first piston; and a piston rod connected to said second piston, said rod having teeth adapted to co-operate with said teeth on said loose piston rod.

KARL MAYBACH.